United States Patent [19]

Lamonica

[11] Patent Number: 4,649,053
[45] Date of Patent: Mar. 10, 1987

[54] METHOD FOR MAKING PIZZA

[76] Inventor: Mark Lamonica, 1533 85th St., Brooklyn, N.Y. 11228

[21] Appl. No.: 841,046

[22] Filed: Mar. 17, 1986

Related U.S. Application Data

[63] Continuation of Ser. No. 748,145, Jun. 21, 1985, abandoned, which is a continuation of Ser. No. 671,026, Nov. 14, 1984, abandoned, which is a continuation of Ser. No. 398,197, Jul. 14, 1982, abandoned.

[51] Int. Cl.$^4$ ............................................. A21D 8/00
[52] U.S. Cl. .................................. 426/302; 426/496; 426/94; 99/422; 99/432; 99/DIG. 15
[58] Field of Search ................ 426/94, 496, 302, 305, 426/502, 505; 249/136; 99/422-423, 432-433, DIG. 15

[56] References Cited

U.S. PATENT DOCUMENTS

| | | | |
|---|---|---|---|
| 1,493,796 | 5/1924 | Anderson | 249/136 |
| 1,531,569 | 3/1925 | Rade | 249/102 |
| 3,347,181 | 10/1967 | Pizzo | 426/27 |
| 4,065,583 | 12/1977 | Ahlgren | 426/243 |
| 4,367,243 | 1/1983 | Brummett | 426/505 |

OTHER PUBLICATIONS

Matz, Bakery Technology & Engineering, 2nd Ed., AVI Publ. Co. Inc., Westport, CT; 1972, p. 387.

*Primary Examiner*—Raymond N. Jones
*Assistant Examiner*—Marianne M. Cintins
*Attorney, Agent, or Firm*—Frishauf, Holtz, Goodman & Woodward

[57] ABSTRACT

Pre-stretched pizza dough is placed on an imperforate thermally conductive disk having an up-turned circumferential lip. The disk is placed in a flat-bottomed pan (either before or after the dough is placed on the disk), the bottom of the pan having two finger holes which are sealed by the disk. A cover shaped to permit stacking of pans is placed on the top of the pan to provide a substantially sealed enclosure, and the pizza dough is left in the enclosure for a period of time, both for storage purposes and to permit the dough to rise and enhance its delicacy and flavor. Then the cover is removed and the disk is pushed out of the pan through the finger holes. The dough is then covered with desired pizza food ingredients and the disk is placed in a cooking oven.

7 Claims, 4 Drawing Figures

METHOD FOR MAKING PIZZA

This application is a continuation, of application Ser. No. 748,145 filed June 21, 1985, which in turn is a continuation of Ser. No. 671,026 filed Nov. 14, 1984, which in turn is a continuation of Ser. No. 398,197 filed July 14, 1982, all now abandoned.

BACKGROUND OF THE INVENTION

This invention relates to a method of cooking pizza pie wherein pizza pies having superior texture and taste can be produced with high efficiency.

The preparation of pizza pies has required a considerable expenditure of manual labor, and efforts have been made to improve the efficiency of the pizza making process and to reduce its cost. Generally speaking, these efforts have involved the use of some sort of a pan for handling and cooking the pizza pie.

One such prior art arrangement is described in U.S. Pat. Nos. 4,065,583 and 4,184,421 to Ahlgren. The arrangement described in these patents uses a pan having a large bottom opening with a supporting annular ridge upon which is placed a thin flexible disk of metal foil having large holes therein to permit passage of heat to the bottom of the pizza dough which rests on top of said metal foil disk. The pizza is stored and cooked in this pan, and thereafter the metal foil disk (and pizza thereon) is removed from the pan by grasping a flange of the disk. The metal foil disk is then discarded.

The side walls of the pans of Ahlgren are shaped so that the pans can be stacked. However, due to the holes in the metal foil disk, air can flow to the bottom of the pizza dough during storage, thus drying out the dough.

During cooking, the edges of the pizza contact the side walls of the pan, which absorb heat from the pizza, so that the edges of the pizza are not properly cooked. Further, during cooking the portions of the bottom of the pizza exposed through the holes in the metal disk are cooked to a greater extent than the other portions of the bottom of the pizza, often resulting in burn spots in the shape of the disk openings.

Another pizza making arrangement is disclosed in U.S. Pat. No. 3,347,181 to Pizzo. This arrangement employs cooking disks on which the pizza dough is placed, the disks being in the form of a mesh or a foraminated sheet, with a peripheral lip which facilitates removal of the disk from the cooking oven by means of a peel. However, the arrangement of Pizzo suffers from the same disadvantage as Ahlgren in that during storage air can reach the pizza dough to dry it out. Further, Pizzo does not show any provision for stacking, and does not utilize a pan from which the disk is removable after storage.

Both Ahlgren and Pizzo suffer from the problem of pizza dough oozing down through the holes in the disk during storage, this problem obviously being more severe in the arrangement of Ahlgren. During cooking, the dough which has oozed down through the holes sticks to the bottom surface of the oven. Further, the cooked pizza is difficult to remove from its support, due to interlocking of the cooked dough in the holes.

Accordingly, an object of the present invention is to provide an improved method for making pizza using a cooking disk and overcoming the disadvantages of the Ahlgren and Pizzo arrangements.

SUMMARY OF THE INVENTION

As herein described, there is provided a method for making pizza, comprising the steps of: (a) placing a layer of uncooked pizza dough on a thermally conductive imperforate rigid disk preferably having an upturned peripheral lip; (b) placing said disk in a pan having an annular side wall and a bottom access hole, so that said disk covers said access hole; (c) placing a cover on said pan over said disk and uncooked pizza dough, so that said dough is enclosed in a substantially sealed container; (d) allowing said container to stand; (e) removing said cover from said pan; (f) removing said disk and the pizza dough thereon from said pan by pushing against the bottom of said disk through said access hole; (g) placing desired pizza food ingredients on said pizza dough; (h) placing said disk and the pizza dough thereon in a cooking oven, and allowing said pizza dough and pizza food ingredients to cook therein to form a cooked pizza; and (i) removing said disk and the cooked pizza from said oven.

IN THE DRAWING

DETAILED DESCRIPTION

Figure 1:
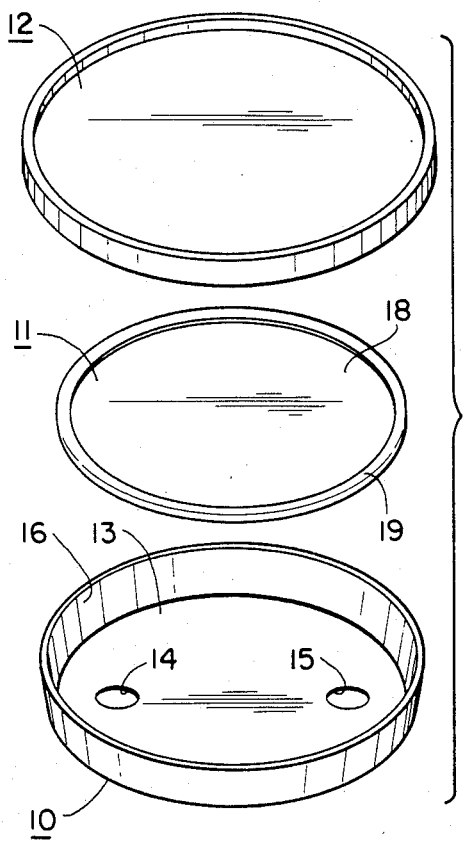
FIG. 1 shows a pan, disk and cover used in the pizza making method according to a preferred embodiment of the present invention.

As shown in FIG. 1, the equipment employed in the method of the present invention utilizes a flat bottom pan 10, a cooking disk 11 and a cover 12, all having a similar configuration in plan view. While these items are illustrated as being circular, they may be rectangular, elliptical, polygonal or of any other desired shape.

The pan 10 has a bottom 13 with finger holes 14 and 15 therein. The finger holes 14 and 15 should preferably be within two to three inches of the outer periphery of the pan 10, so that one can hold the pan at the periphery and simultaneously press one finger of each hand through corresponding ones of the finger holes 14 and 15.

The pan 10 also has an upwardly extending circumferential side wall 16, which may extend perpendicular to the bottom 13 or may be slightly outwardly flared with respect thereto. The pan 10 is employed for storage and handling of the stretched pizza dough 17 (FIG. 2), and therefore need not be made of a heat resistant material. For example, the pan 10 may be made of a suitable plastic such as polyethylene.

The cooking disk 11 is solid, i.e. it has an imperforate flat bottom 18. In addition, the cooking disk 11 has an upturned peripheral lip 19 which reinforces the disk structure and provides an edge which facilitates engagement and disengagement with the peel used to place the disk in, and remove the disk from, the cooking oven.

The disk 11 is made of a thermally conductive material such as steel, preferably having a diameter in the range of 7 to 24 inches and a thickness in the range of 0.018 to 0.024 inches.

Pre-stretched pizza dough 17 is placed on the disk 11, either before or after the disk 11 is placed in the pan 10.

Alternatively, the disk 11 may first be placed in the pan 10, and thereafter unstretched pizza dough may be placed on the disk 11 and stretched, with the side walls 16 of the pan 10 serving as a form for the pizza dough during stretching thereof.

Figure 2:
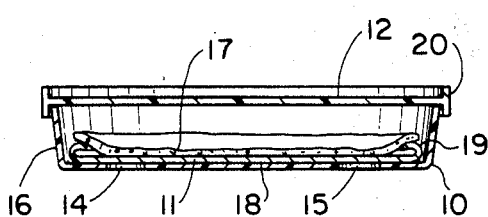
FIG. 2 is a cross-sectional view of the pan, disk and cover of FIG. 1, assembled to store a disk of pre-stretched uncooked pizza dough.

As seen in FIG. 2, when the disk 11 is placed in the pan 20, the bottom surface of the disk closes off the finger holes 14 and 15, to prevent air from reaching the pizza dough 17 through said finger holes.

The next step of the method of the present invention is to place the cover 12 atop the side walls 16 of the pan 10, to form a substantially sealed enclosure about the pizza dough 17. By the term "substantially sealed" is simply meant an enclosure such that air flow to the pizza dough 17 is sufficiently small so that the pizza dough is not dried out during storage for periods on the order of 24 hours. The enclosure provided by the pan 10, disk 11 and cover 12 is by no means airtight, but may be.

The cover 12 may be of any suitable material, and preferably comprises aluminum or a plastic such as polyethylene or ABS. The cover 12 has an outer peripheral lip 20 which extends upward and downward to facilitate stacking of similar pans and covers.

With this arrangement a plurality of pre-stretched pizza dough layers 17 may be prepared in advance of sale and stacked to take up a minimum of storage space. Preferably, the stretched pizza dough 17 should be stored for at least one hour at room temperature to permit raising of the pizza dough, which makes the dough more delicate and improves its texture and flavor. A substantial improvement in texture and flavor can be realized by storing the pizza dough 17 overnight in the container shown in FIG. 2 of the drawing. Such storage is not possible with the prior art arrangements previously discussed, since they expose the pizza dough to an undesirable amount of air during this period, and the long storage time of the pizza dough would cause it to sink through the holes in the bottoms of the prior art disks. Storage may be for 24 hours and even longer.

The cooking disk 11 is preferably colored black to permit it to absorb as much heat as possible during the cooking process, and is preferably black magnetic material.

Instead of making the pan 10 of a suitable plastic, it may alternatively be made of a magnetic material such as steel; and the disk 11 may also be made of a magnetic material, with either the disk 11 or pan 10 being permanently magnetized so that the bottom of the disk 11 is magnetically adherent to the inner bottom surface of the pan 10, thus facilitating handling of the container shown in FIG. 2 of the drawing.

When an order is placed for a cooked pizza pie, the cover 12 is removed from the container of FIG. 2 and the disk 11 containing the stretched pizza dough 17 is pushed out of the pan 10 through the finger holes 14 and 15.

Then the cooking disk 11 and stretched pizza dough 17 are placed on a counter or other working surface, and the desired additional food ingredients (such as sauce and various solid ingredients) are placed on the stretched pizza dough layer 17, after which a peel is used to insert the cooking disk 11 into the cooking oven. If desired, a tunnel oven can be used, since the imperforate disk 11 does not permit the bottom of the pizza dough layer 17 to contact the tunnel oven supporting belt, as would occur in prior art arrangements which permit the pizza dough to ooze through holes in the supporting disk.

During cooking, the disk 11 provides sufficient lateral heat transfer to equalize the temperature across the bottom of the pizza dough layer 17 and thereby minimize the risk of overcooked or burned areas. The upturned circumferential lip 19 of the cooking disk 11 helps to cause the edges of the pizza to sponge up, thus improving the quality of the pizza product. The size of lip 19 in FIG. 2 and the degree of raising of lip 19 in FIG. 2 are exaggerated for ease of explanation. In practice, the lip is preferably about 1/16 inch long in the radial direction of the disk 18, and is pressed down to contact the upper surface of the disk 18.

After cooking, the disk 11 (and pizza thereon) is removed from the oven by means of a peel. Alternatively, the peel may be inserted at the top of the peripheral lip 19, i.e. between said lip and the bottom of the pizza, so that the peel removes only the pizza from the oven; in which event the disk 11 is therafter separately removed from the oven.

The lip 19 creates a rounded circumferential edge on the disk 18 so that the insertion of the peel between the disk and the upper surface of the oven is facilitated.

While the pizza food ingredients can be added to the stretched pizza dough after the cooking disc 11 is removed from the pan 10, it is also possible to add the additional food ingredients while the disk 11 and pizza dough 17 are still in the pan 10, and many such pre-prepared pizzas can be stacked (with covers on pans) for later cooking. In this case, the pizza, with ingredients added thereto, is then removed from the pan and placed in the oven (with disk 11 thereunder) for cooking.

In addition to reinforcing the disk structure, the lip 19 also slightly raises the edge of the pizza which is placed thereon to help keep ingredients, such as sauce, from flowing off the peripheral edges of the pizza.

Figure 4:
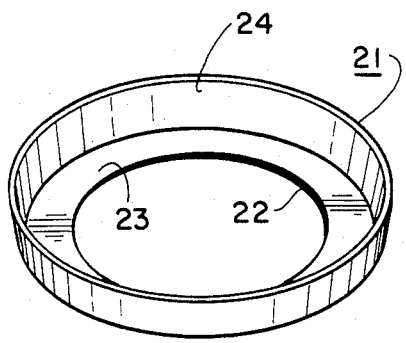
FIG. 4 shows a modified pan arrangement of the invention.
Figure 3:
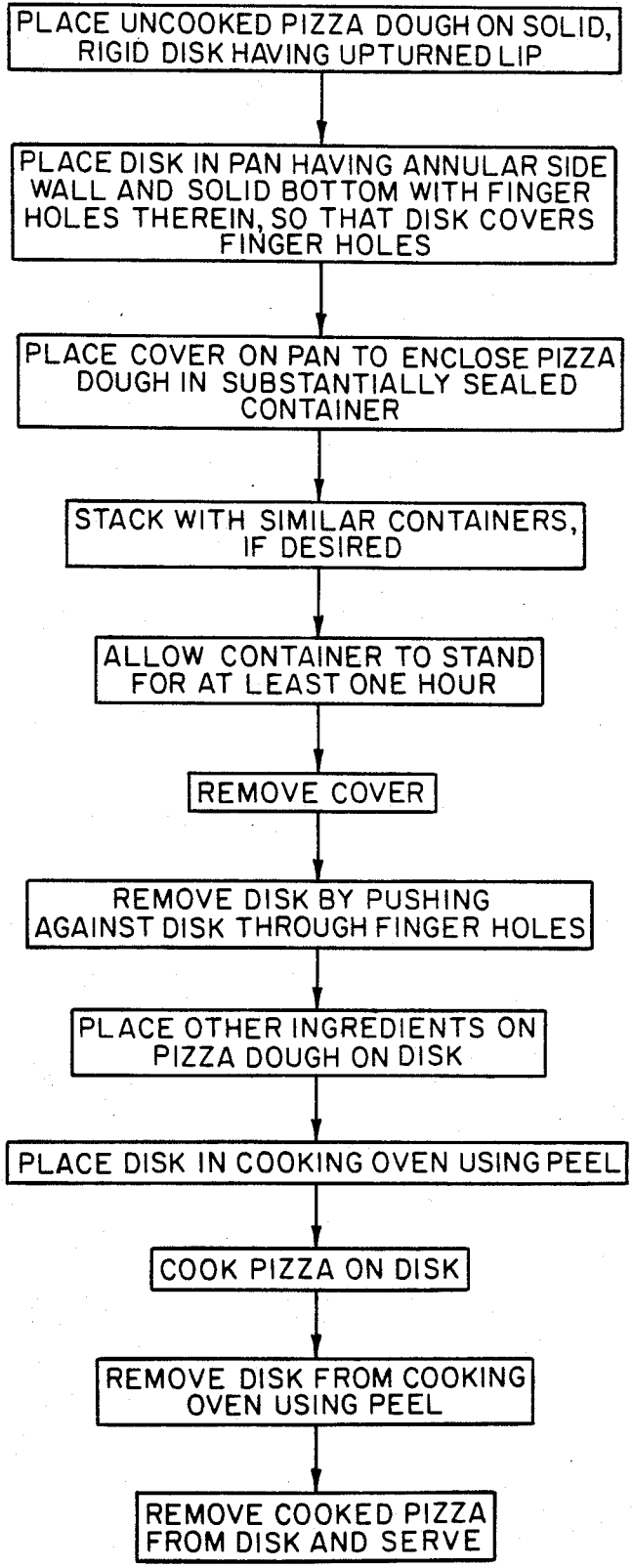
FIG. 3 is a flow chart of the method according to a preferred embodiment of the present invention.

FIG. 4 shows a modified pan 21 having an inwardly directed peripheral lip 23 for supporting the disc 11 during storage, and an upstanding wall 24. Pan 21 has a large central opening 22 and can be substituted for pan 10 and used in the described manner.

After the pizza is cooked, if it is not immediately used, or immediately sold (in a restaurant), it can be replaced again in the pan 10 (with the disk 18 on lip 19) and covered so there will be little or no dehydration of the cooked pie. It can be reheated later and used.

I claim:

1. A method for making pizza, comprising the steps of:
   (a) placing a layer of uncooked pizza dough on a thermally conductive, imperforate, flat surfaced, rigid metal disk, said imperforate disk having an upturned peripheral lip on which a peripheral portion of said layer of uncooked pizza dough is placed, thereby raising up said peripheral portion of said layer of pizza dough;
   (b) placing said imperforate disk in a pan having an annular side wall and a bottom portion with at least one opening therein, so that said imperforate disk covers said at least one opening,
   (c) placing a cover on said pan over said imperforate disk and uncooked pizza dough, so that said uncooked dough is enclosed in a substantially sealed container formed by said imperforate disk, annular side wall and cover;
   (d) allowing said substantially sealed container, with said uncooked dough therein, to stand for a period of time of at least one hour and sufficient to permit rising of the dough in said container;

(e) removing said cover from said pan;

(f) removing said disk with said uncooked pizza dough thereon from said pan by pushing against the bottom of said imperforate disk through said at least one opening of said pan so that said imperforate disk is free of said annular side wall;

(g) placing desired pizza food ingredients on said uncooked risen pizza dough;

(h) placing said imperforate disk and the uncooked pizza dough thereon in a cooking oven, and allowing said pizza dough and pizza food ingredients to cook in said oven on said imperforate disk to form a cooked pizza, said imperforate disk and pizza dough with said ingredients thereon presenting a substantially flat arrangement in said oven with no upstanding side wall therearound, so that heated air in said oven freely circulates over the pizza being cooked without being blocked by upwardly directed side walls, thereby improving cooking of the pizza; and (i) removing said imperforate disk and cooked pizza as a unit from said oven.

2. The method of claim 1, wherein said disk and said pan each comprise a magnetic material, one of said disk or said pan being permanently magnetized.

3. The method according to claim 1, wherein said disk comprises black colored steel having a thickness in the range of 0.018 to 0.024 inches.

4. The method of claim 1 or 3, wherein said disk has a diameter in the range of 7 to 24 inches.

5. The method according to claim 4, wherein said disk comprises black colored steel having a thickness in the range of 0.018 to 0.024 inches.

6. The method of claim 1, wherein said step (b) is carried out before step (a), and said pizza dough is stretched on said disk within said pan, so that the walls of the pan act as a mold for the pizza dough.

7. The method of claim 1, comprising placing said disk in a pan having said annular side wall and a solid bottom portion, said solid bottom portion having at least one finger hole therein through which a finger may be passed for pushing said disk out of said pan.

* * * * *